United States Patent [19]

DuBois et al.

[11] 4,195,560
[45] Apr. 1, 1980

[54] ELECTRIC CREPE MAKER

[75] Inventors: Jean-Pierre DuBois, Lombard; William L. Lockett, Downers Grove, both of Ill.

[73] Assignee: Sunbeam Corporation, Chicago, Ill.

[21] Appl. No.: 814,803

[22] Filed: Jul. 11, 1977

[51] Int. Cl.² .......................................... A47J 37/10
[52] U.S. Cl. ...................................... 99/422; 99/431; 219/459; 219/464
[58] Field of Search .......... 99/422, 326, 332, 339–340, 99/372, 423, 425, 446, 447; 16/110 R, 110 A, 116, 117, 118; 219/260, 454, 459, 460, 463–464, 522, 544, 455–456

[56] References Cited

U.S. PATENT DOCUMENTS

| 450,906 | 4/1891 | Blakely | 16/118 X |
|---|---|---|---|
| 1,018,576 | 2/1912 | Madsen | 219/454 X |
| 1,201,694 | 10/1916 | Carpenter | 219/454 |
| 1,482,305 | 1/1924 | Hodgson | 16/110 A |
| 1,568,767 | 1/1926 | Proulx | 99/339 X |
| 2,482,614 | 9/1949 | Flora | 16/110 A X |
| 2,880,665 | 4/1959 | Katz | 99/339 |
| 3,010,006 | 11/1961 | Schwaneke | 219/438 X |
| 3,059,809 | 10/1962 | Thompson | 16/114 A X |
| 3,349,726 | 10/1967 | Fono | 99/423 X |
| 3,517,605 | 6/1970 | Hursch et al. | 99/423 |
| 3,870,861 | 3/1975 | Werych | 99/339 X |
| 3,994,211 | 11/1976 | Stanek | 99/425 |
| 4,004,130 | 1/1977 | Blackwood | 99/422 X |
| 4,006,676 | 2/1977 | Adamis | 99/422 |

FOREIGN PATENT DOCUMENTS

| 198092 | 3/1938 | Switzerland | 16/110 A |
|---|---|---|---|
| 352424 | 3/1961 | Switzerland | 219/459 |

Primary Examiner—Harvey C. Hornsby
Attorney, Agent, or Firm—George R. Clark; Neil M. Rose; Clifford A. Dean

[57] ABSTRACT

An electric crepe maker having a base and a separate skillet-like crepe-making-pan. The base has a heating plate with a configuration which is complementary to the inner surface of the pan whereby the pan is adapted to be supported thereon in an inverted position in heat exchange contact therewith during the cooking of a crepe on the outer surface thereof. The crepe pan may also be supported on the heating plate in an upright position for cooking other foods in a conventional manner. The crepe pan is provided with an insulated handle and the heating plate is provided with a heating element which is controlled by an adjustable thermostat switch.

10 Claims, 6 Drawing Figures

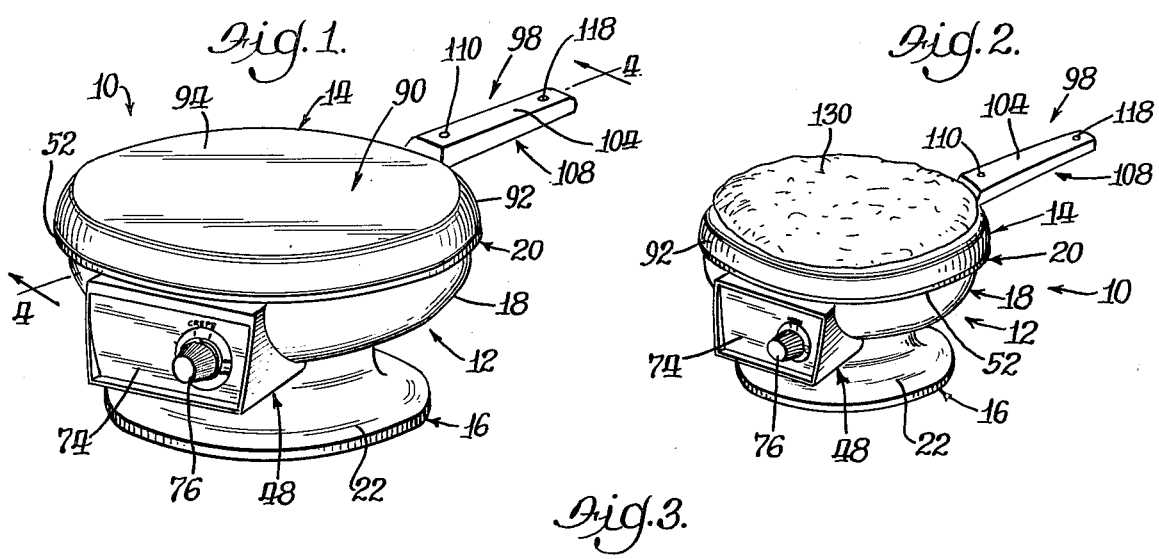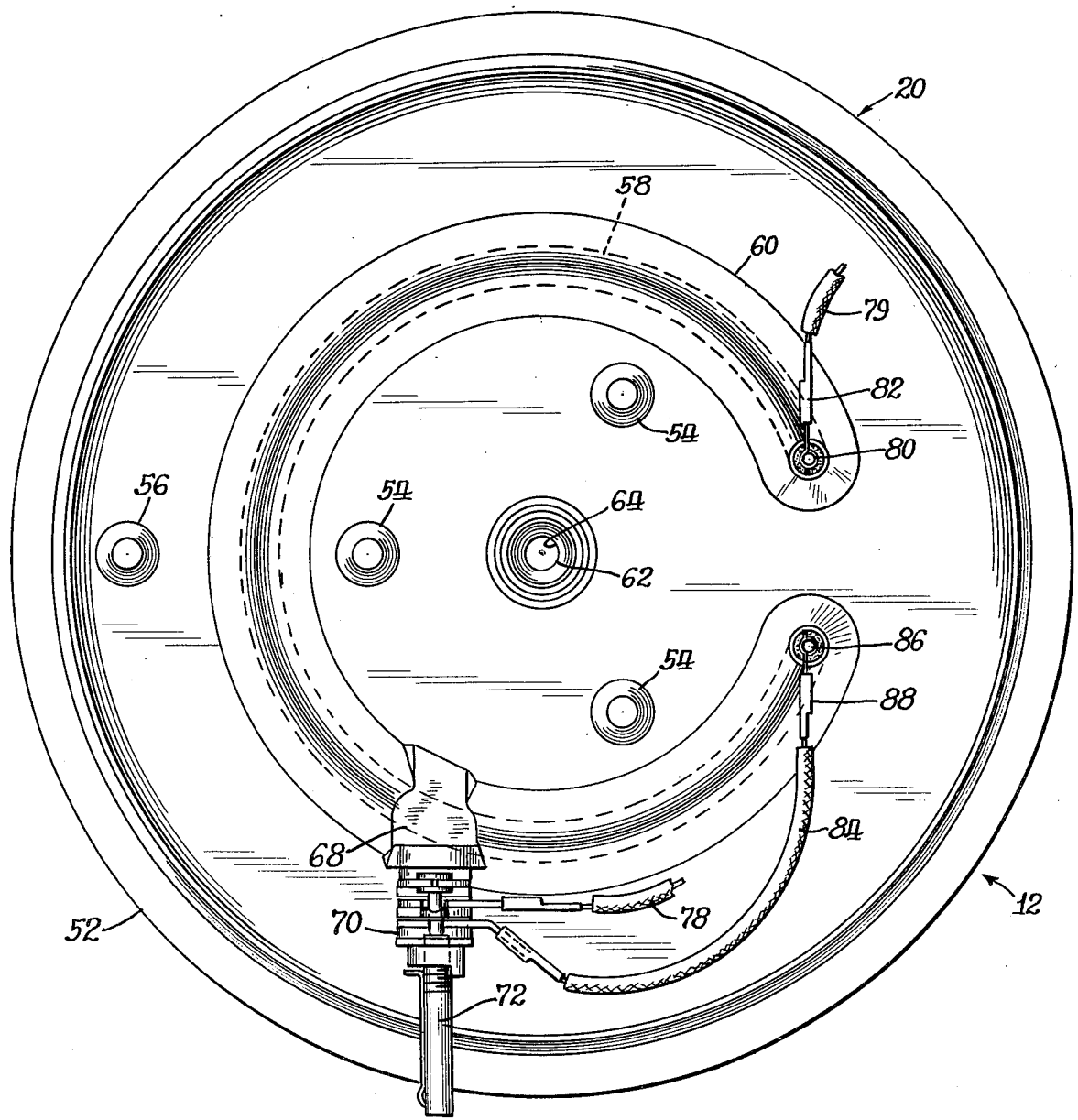

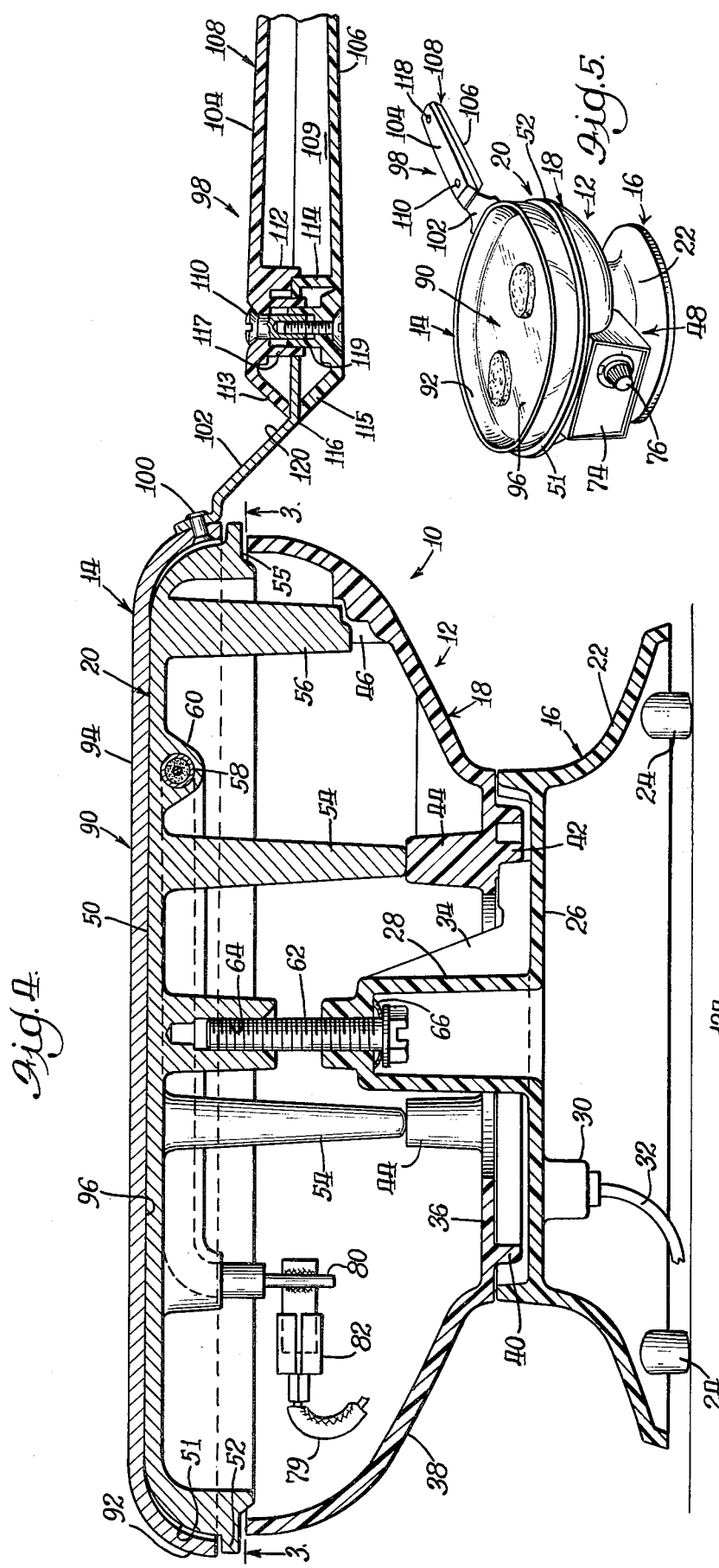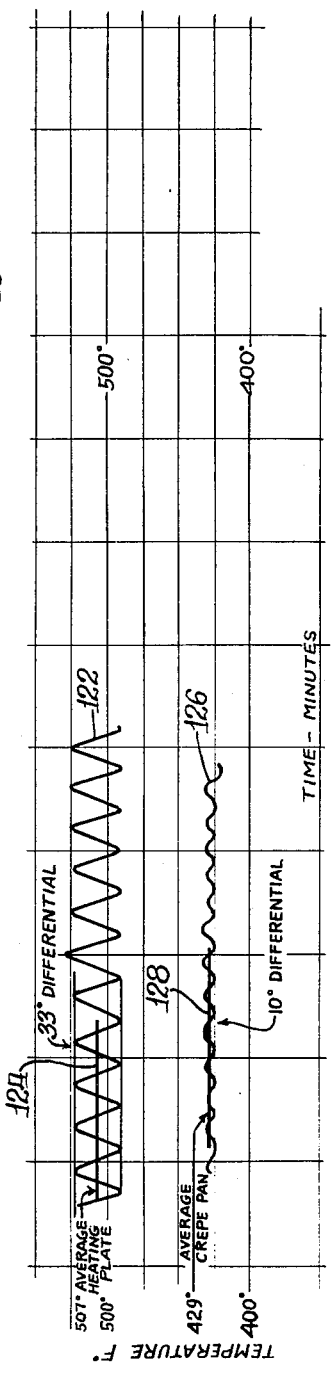

ELECTRIC CREPE MAKER

BACKGROUND OF THE INVENTION

1. Field of the Invention

The present invention pertains to an electric crepe maker characterized by a heating base and a separate skillet-like crepe-making-pan which is adapted to be seated on the heating base in an inverted position for cooking a crepe on the outer surface thereof and to be supported on the heating base in an upright position for cooking other foods in a conventional manner.

2. Description of the Prior Art

Crepes have long been made in conventional frypans by pouring a thin layer of batter into the interior of same and cooking the crepes over any suitable source of heat. As shown in Castronuovo U.S. Pat. No. 2,962,985 and Fono U.S. Pat. No. 3,349,726, crepes have also been made by dipping the underside or outer surface of pre-heated conventional frypans into a supply of crepe batter after which the pans are inverted and placed over an external source of heat for the cooking operation. More recently, electrified crepe pans have been developed in which a heating element is affixed to the inner surface of a conventional type frypan with an electrical power cord extending from the frypan handle and with some form of leg structure being provided for supporting the pan in an inverted position. The pan bottom is dipped into a supply of crepe batter with the pan then being inverted and supported on its leg structure for electrical cooking of crepes. Although several models of this type of electrified crepe pan are on the market, no issued patents covering same have been noted to date.

Although the electrified crepe pans described herein have become quite popular with the consumer, it is noted that they do have several disadvantages. Obviously, the pans which have a heating element formed thereon including electrical wiring, connectors, thermostats, etc. and power cords extending through the handle are not only relatively heavy but are also quite awkward to use when same are continually being dipped in a supply of batter, rotated to an inverted position, and then rotated back again. The power cord often gets in the way and in many instances the handle design is such that it is awkward to dip the outer surface of the pan into a supply of crepe batter. Another disadvantage is that few, if any, of the electrified crepe pans are provided with adjustable thermostats for controlling the crepe cooking temperature. Further, with the heating element and supporting leg structure affixed to the inner surface of such electrified crepe pans these pans may not be used alternatively for cooking foods within the pans in the conventional manner.

SUMMARY OF THE INVENTION

The present invention is concerned with a lightweight, easily used, electric crepe maker which is characterized by a heating base having a heating surface which is generally flat, circular and with a downwardly curved peripheral portion and by a separate shallow skillet-like crepe-making-pan having an inner surface which is complementary in configuration to the heating surface of the base and which is adapted, when the pan is inverted, to being fitted thereover in heat exchange contact therewith. The outer surface of the crepe pan is characterized by a substantially flat circular central portion and a curved periphery portion, which surface is adapted, after being pre-heated, to be dipped into a supply of crepe batter after which the pan is first rotated approximately 90° to a generally vertical position, to permit any excess batter to drip back into the batter supply, and is then rotated a further 90° to an inverted position with the pan then being fitted over the heating surface of the base for cooking of the crepe thereon. The crepe pan is provided with an insulated handle and a heating element affixed to the underside of the heating surface of the base is controlled by an adjustable thermostat switch having an "off" position, a "warming" position, a "frying" position and a "crepe cooking" position. The pan is very lightweight as compared to the prior art electrified pans having heating elements and supporting leg structure formed thereon and, having no power cord extending from the handle, is much more easily manipulated and rotated as required in the crepe making operation than the prior art electrified crepe pans which have power cords extending from the handles thereof. This crepe pan may also be used on the heating base in an upright position for cooking foods disposed therein in a conventional manner. This is not possible with the prior art electrified crepe pans described herein.

Lab testing has indicated that the crepe cooking surface of the subject crepe pan provides a more even cooking temperature than would be provided on the cooking surface of the electrified crepe pans noted herein. These lab tests disclose that the temperature variations on the pan crepe-cooking surface, due to cycling of a given thermostat, are substantially less than the temperature variations at the same point on the heating surface of the base due as a result of the interface between the heating surface and the inner surface of the pan. It is thus presumed that the electrified pans having heating elements affixed directly thereto would have temperature variations on the cooking surfaces of same which would be more like those on the heating surface of the base disclosed herein, whereby more even crepe-cooking temperatures are provided by the subject pan than by the electrified crepe pans now on the market.

The pan itself is provided with a handle which is insulated substantially from the pan in that a hollow hand-grip portion is formed by a pair of interfitted plastic halves which define a cavity therebetween, which hand grip portion is attached to the pan by a low-heat-conductive metal bracket which is secured within the front portion only of the hand grip portion of the handle.

It is an object of the present invention to provide a new and novel electric crepe maker.

It is a further object of the present invention to provide such an electric crepe maker which is characterized by a heating base portion and a separate skillet-like crepe-making-pan adapted for use on the heating base in either an inverted position for cooking crepes on the outer surface thereof or in an upright position for conventional cooking, such as frying.

It is still a further object of the invention to provide such an electric crepe maker wherein the heating base is characterized by a heating plate having a heating surface which is substantially flat, circular and with a downwardly curved peripheral edge portion and wherein the inner surface of the crepe pan is complementary in configuration to the heating surface of the heating plate wherein same is adapted to be fitted over the heating plate in heat exchange contact therewith whereby to cook a crepe on the outer surface thereof.

A still further object of the present invention is to provide such an electric crepe maker wherein the outer surface of the crepe pan is substantially flat, circular and having a curved peripheral edge portion, which surface is adapted to be either dipped into a supply of crepe batter during crepe making operations or to be supported in heat exchange contact on the heating plate of the base for the cooking, as by frying, of other foods in a conventional manner.

Further objects of the present invention are to provide such an electric crepe-maker wherein the pan is provided with an insulated handle and wherein the temperature of the heating plate is controlled by an adjustable thermostat switch having an "off" position, a "warming" position, a "frying" position and a "crepe cooking" position.

Still another object of the present invention is to provide such an electric crepe maker wherein the temperature variations on the cooking surface of the pan are substantially less than the temperature variations on the heating plate whereby to provide a more even cooking temperature on the crepe cooking surface of the pan.

Further objects and advantages of the present invention will become apparent as the following description proceeds, and the features of novelty which characterize the invention will be pointed out with particularity in the claims annexed to and forming a part of this specification.

BRIEF DESCRIPTION OF THE DRAWINGS

For a better understanding of the present invention, reference may be had to the accompanying drawings in which:

FIG. 1 is a front perspective view of an electric crepe maker constructed in accordance with the present invention;

FIG. 2 is a front perspective view on a slightly smaller scale of the crepe maker of FIG. 1 during the cooking of a crepe thereon;

FIG. 3 is a horizontal sectional view taken generally along the line 3—3 of FIG. 4;

FIG. 4 is a vertical sectional view on an enlarged scale taken generally along the line 4—4 of FIG. 1;

FIG. 5 is a front perspective view showing the crepe pan being used as a skillet on the heating base; and FIG. 6 is a time/temperature graph showing the temperature variations at the center of both the heating plate and the outer surface of the crepe pan.

Referring now more particularly to the drawings, there is illustrated a new and improved electrical crepe maker 10 comprising a heating base 12 and a shallow skillet-like crepe pan 14. The heating base 12 is characterized by a lower base portion 16 and an upper base portion 18 both of which are formed of low-heat-conductive plastic material for insulating purposes. The heating base 12 also includes a heating plate 20 which is formed of high-heat-conductive metal. The lower base portion 16 is defined by a cylindrical wall 22 that is curved downwardly and outwardly and has a series of depending feet 24 molded on the inner surface thereof. An integrally formed horizontal wall 26 of the lower base portion 16 is spaced a relatively short distance below the upper edge of the cylindrical wall 22 and is characterized by a centrally located, upstanding bored mounting boss 28 and by an off-center depending boss 30 through which a standard power cord 32 extends. A vertically disposed locating rib 34 is provided between the horizontal wall 26 and the mounting boss 28 as an aid to rotatably locating the upper base portion 18 relative to the lower base portion 16.

The upper base portion 18 is characterized by a lower cylindrically bored horizontally extending wall 36 which fits over the mounting boss 28 on the lower base portion 16 and is supported on the upper edge of the lower base wall 16. The upper base portion 18, which is open at its upper end, is further characterized by an upwardly and outwardly curved wall 38. A short annular skirt portion 40 and an abutment 42 both depend from the underside of the horizontal wall 36 and are interengageable with the locating rib 34 on the lower base portion 16 whereby to aid in properly rotatably locating the upper base portion 18 relative to the lower base portion 16 during assembly thereof.

Three integrally formed, circumferentially spaced upstanding bosses 44 are provided on the upper surface of the horizontal wall 36 for a purpose to be described hereinafter. The inner surface of the upper base wall 38 is also provided at one side with a vertically slotted, inwardly extending locating abutment 46 which, as will later be described herein, serves to rotatably locate the heating plate 20 relative to the upper base portion 18. The curved wall 38 of the upper base portion 18 is interrupted at the front thereof by an integrally formed, generally rectangular control housing 48 which projects outwardly thereof.

The heating plate 20 has a generally circular and substantially flat upper heating surface 50 having a downwardly curved peripheral portion 51 which is provided at its lower edge with an outwardly extending annular shoulder 52. The heating plate 20 is supported on the upper base portion 18 by three integrally formed, depending standoff bosses 54 which are supportingly engaged on the upper ends of the bosses 44 on the upper base portion 18 in a manner such that an annular gap 55 is defined between the upper edge of the circular wall 38 of the upper base portion 18 and the underside of the shoulder 52 of the heating plate 20 whereby to provide for some cooling of the interior of the heating base 12. Also depending from the underside of the heating plate 20 adjacent the periphery thereof is a locator post 56 which is engageable in the slotted locating abutment 46 for rotatably locating the heating plate 20 relative to the upper base portion 18.

For the purpose of heating the heating plate 20, an electrical heating element 58 of the conventional sheath type is provided. As best illustrated in FIG. 3 of the drawings, this heating element 58 is of a C-shape and is illustrated as being cast into or imbedded in the metal defining the heating plate 20, specifically within a downwardly projecting rib structure 60 thereof. As is well known in the art, the heating element 58 is characterized by a resistance heater wire which is coaxially aligned within an outer tubular sheath and is electrically insulated therefrom by a conventional filler material preferably comprising compacted magnesium oxide granules which have good heat transfer capability.

The heating base 12 is assembled with the upper base portion 18 sandwiched between the heating plate 20 and the lower base portion 16 by a threaded bolt 62 which extends upwardly through the mounting boss 28 on the lower base portion 16 and into threaded engagement in an integral, center threaded boss 64 which depends from the center of the underside of the heating plate 20, a spring washer 66 being provided between the head of the bolt 62 and an upper end wall of the mounting boss 28.

The underside of the heating plate 20 is also provided with a cast-in mount 68 for an adjustable thermostat switch 70 which has a control shaft 72 which extends outwardly through an outer end wall 74 of the control housing 48. A knob 76 provided on the end of the control shaft 72 permits rotation of the knob 76 between an "off" position, a "warming" position, a "frying" position and a "crepe making" position.

One lead 78 of the power cord 32 is connected to the thermostat switch 70 and the other lead 79 of the power cord is connected to one terminal pin 80 of the heating element 58 by a push-on connector 82. Another lead 84 is connected between the thermostat switch 70 and the other terminal pin 86 of the heating element 58 by a push-on connector 88.

The shallow skillet-like crepe pan 14, which is formed of a high-heat-conductive metal, is circular in shape with a generally flat central portion 90 having, as viewed in FIG. 4, a downwardly curved peripheral portion 92 whereby to define a generally convex upper or outer surface 94 for cooking crepes and a generally concave underside or lower surface 96 which fits over and is substantially complementary to the upper heating surface 50, 51 of the heating plate 20 for maximum heat conductivity from the heating plate 20 to the crepe pan 14. If desired, both surfaces 94 and 96 may be provided with a Teflon coating.

The crepe pan 14 is provided with a handle 98 which is secured to the curved peripheral portion 92 of the pan by a conventional rivet 100. The handle 98 is characterized by an angular bracket 102 which is riveted at one end to the pan 14 and which, as viewed in FIG. 4, extends downwardly and outwardly at an angle and then is bent so as to extend generally horizontally between the inner ends of upper and lower halves 104 and 106 of a hand grip portion 108 of the handle 98. The upper and lower handle halves 104 and 106 define a hollow or cavity 109 within the hand grip portion 108 of the handle 98. The two interfitting handle halves 104 and 106 are formed of low-heat-conductive plastic and the metal bracket 102 is formed of low-heat-conductive material with the inner ends of the handle halves being secured together by a known type female nut and screw fastener 110 which extends through a bore formed in the bracket 102. The end of the bracket 102 is trapped between inwardly extending abutments 112 and 114 which are formed, respectively, on the two handle halves 104 and 106 with the bent portion of the bracket 102 being trapped between converging front edges 113 and 115 of the handle halves 112 and 114, as best shown at 116 in FIG. 4. At the point of connection by the fastener 110, the two handle halves 104 and 106 are interfitted together by telescopically engaged inwardly projecting sleeves 117, 119 which are concentric about the fastener 110. Although not shown in detail in the drawings, the outer ends of the handle halves 104 and 106 are also secured together by a similar type fastener 118, as shown in FIGS. 1, 2 and 5.

The angled portion of the bracket 102 and the converging front edge 113 of the upper handle half 104 define a V-shaped notch 120 which facilitates dipping of the convex surface 94 of the crepe pan 14 into a pan of crepe batter by providing batter-pan-edge clearance. Insulation and cooling of the hand grip portion 108 of the handle 98 is maximized by its being spaced from the pan by the bracket 98, by its being hollow, by the structural arrangement wherein the metal bracket 102 extends only a short distance into the hand grip portion 108, and by the bracket 102 and the handle halves 104 and 106 being formed of low-heat-conductive materials.

In a crepe making operation, the pan 14 is first preheated on the base 12 after which the outer surface 94 is dipped into a pan of crepe batter after which the pan 14 is first rotated approximately 90° to a generally vertical position momentarily to permit any excess batter to drip back into the batter pan and then is further rotated another 90° into an inverted position and seated on the heating plate 20 on the base 12, as shown in FIG. 4 for completion of the crepe making operation, the thermostat switch 70 being in its "crepe cooking" position. A crepe 130 being cooked is shown in FIG. 2. Use of the pan 14 as a conventional skillet is illustrated in FIG. 5. When so used the thermostat switch 70 is turned to its "frying" position. As a supply of crepes may be prepared well prior to use and then frozen, the thermostat switch 70 is provided with a "warming" position for warming pre-prepared frozen crepes after same have been sufficiently thawed. In most thermostat controlled cooking appliances there is a continuous cycling of the power to the heating element and thus variations in temperature of the cooking surfaces over various periods of time. Lab tests have shown that with the electric crepe maker 10 disclosed herein, the temperature variations at various points on the crepe cooking surface 94 of the pan 14 are substantially less than the temperature variations at the same points on the heating surface 50 of the heating plate 20. Actual representative time/temperature curves obtained in lab tests and illustrative of this feature are shown in FIG. 6. In the graph shown in FIG. 6, a time/temperature curve taken at the center of the heating plate 20 is indicated by a reference numeral 122 with the average temperature line of 507° F. at that point being indicated by the reference numeral 124. Also shown in FIG. 6 is a time/temperature curve taken at the center of the crepe pan cooking surface 94, which curve is identified by reference number 126, with the average temperature line of 429° F. at the center of the crepe pan being identified by reference numeral 128.

As shown by a comparison of the curves 122 and 126, the temperature variations on the pan 14, at a given thermostat switch setting, were only in the order of 10° F. whereas the temperature variations on the heating plate 20 were in the order of 33° F. Thus the average temperature variation on the pan 14 is approximately one-third that of the heating plate 20 whereby to provide a more evenly controlled temperature on the crepe cooking surface 94 of the pan 14 than would be provided on the heating plate 20.

While there has been shown and described a preferred embodiment of the present invention, it will be apparent to those skilled in the art that various changes and modifications may be made without departing from the invention in its broader aspects and it is, therefore, contemplated in the appended claims to cover all such changes and modifications that fall within the true spirit and scope of the present invention.

What is claimed as new and desired to be secured by Letters Patent of the United States is:

1. An electric crepe maker comprising a heating base having a substantially flat, metallic circular heating surface curved downwardly at its periphery, and a removable metallic skillet-like crepe-making-pan having an inner surface complementary to said heating surface including said curved peripheral portion thereof and adapted to be seated thereover with said inner surface in intimate heat exchange contact throughout its entire surface with said heating surface, an outer surface having a substantially flat, circular crepe-cooking surface which is curved downwardly at its periphery, and an insulated handle.

2. An electric crepe maker as recited in claim 1 wherein said heating surface and said pan are formed of high-heat-conductive metal, and wherein said insulated handle is characterized by a hollow hand-grip portion formed of two low-heat-conductive plastic halves defining a cavity therebetween, and by a bracket formed of low-heat-conductive metal which is secured at one end to an edge of said pan and which is fastened at its opposite end between the front ends only of said hand-grip halves of said hand-grip portion of said handle.

3. An electric crepe maker as recited in claim 2 wherein said handle bracket and the forward end of one of said hand-grip halves define a V-shaped notch spaced from said pan edge which provides batter-pan-edge clearance when the outer surface of said crepe-making-pan is being dipped into a shallow pan of crepe batter.

4. An electric crepe maker comprising a base, a heating plate mounted on said base and having a generally flat circular heating surface characterized by a downwardly curved outer periphery, heater means for applying heat to said heating plate, and a separate skillet-like crepe pan having a handle, a crepe-batter-receiving outer surface, and an inner surface seatable throughout its entire surface with the heating surface of said heating plate such that the two surfaces are in intimate heat exchange contact during a crepe cooking operation said latter two surfaces being substantially complementary to said heating surface of said heating plate including said curved outer peripheral portion thereof, said pan, after being pre-heated on said heating plate, being adapted to have said outer surface dipped into crepe batter after which the pan is first rotated into a generally vertical position and held there momentarily and is then further rotated into an inverted position and positioned over said heating plate in intimate heat exchange contact therewith for cooking of the crepe.

5. An electric crepe maker as recited in claim 4 wherein said heating plate and said crepe pan are formed of high-heat-conductive metal, and wherein said handle is insulated by a hollow hand-grip portion formed by a mating pair of low-heat-conductive plastic halves defining a cavity therebetween, and by a bracket formed of low-heat-conductive metal which is secured at one end to an edge of said crepe pan and which is fastened at its opposite end between the front ends only of said hand-grip halves of said hand-grip portion of said handle.

6. An electric crepe maker comprising a heating base characterized by a lower plastic base portion, an upper plastic base portion, and a high-heat-conductive metal heating plate having a substantially flat, circular heating surface with a downwardly curved periphery, interfitting means on said upper and lower base portions and said heating plate for rotatably locating said base portions and said heating plate relative to one another, means securing said lower base portion to said heating plate with said upper base portion trapped therebetween in a manner such that an annular ventilation gap is defined between the downwardly curved periphery of said heating plate and an upper edge of said upper base portion, an electrical heating element in intimate heat exchange relationship with the underside of said heating plate, an adjustable thermostat switch associated with said heating element for controlling the temperature of said heating surface and having an "off" position, and a separate skillet-like crepe-making-pan formed of high-heat-conductive metal and having an insulated handle, said pan having inner and outer surfaces characterized by substantially flat circular central portions and by curved peripheral portions with said inner surface being substantially complementary to said heating surface of said heating plate and adapted to be seated thereon in heat exchange contact therewith, after said outer surface has been dipped into a pan of crepe batter, rotated 90° to a vertical position momentarily, and the rotated another 90° to an inverted position, for the cooking of a crepe on said outer surface.

7. An electric crepe maker as recited in claim 6 wherein said insulated handle is characterized by a hollow hand-grip portion formed of a pair of interfitted low-heat-conductive plastic halves defining a cavity therebetween, and by a bracket formed of low-heat-conductive metal which is secured at one end to an edge of said crepe pan and which is fastened at its opposite end between the front ends only of said hand-grip halves of said hand-grip portion of said handle.

8. An electric crepe maker as recited in claim 7 wherein said handle bracket and the forward end of one of said hand-grip halves define a V-shaped notch which provides batter-pan-edge clearance when the outer surface of said crepe-making-pan is being dipped into a shallow pan of crepe batter.

9. An electric crepe maker comprising a heating base having a generally flat circular heating surface characterized by a downwardly curved outer periphery, heater means for applying heat to said heating surface, an adjustable thermostat switch for controlling said heater means, and a separate skillet-like pan having a crepe-batter-receiving outer surface and an inner surface for receiving other foods to be cooked, said inner surface of said pan being substantially complementary in configuration to said heating surface and being seatable over and in intimate heat exchange contact with said heating surface during a crepe cooking operation, said pan also being adapted to be supported in an upright position on said heating surface with said outer surface in intimate heat exchange contact therewith for cooking other foods on said inner surface thereof.

10. An electric crepe maker comprising a base, a heating plate mounted on said base and having a generally flat circular heating surface characterized by a downwardly curved outer periphery, heater means for applying heat to said heating plate, an adjustable thermostat switch for controlling said heater means and having an "off" position, a "warming" position, a "frying" position, and a "crepe cooking" position, and a separate skillet-like pan having a handle, a crepe-batter-receiving outer surface, and an inner surface, said inner surface of said pan being substantially complementary in configuration to said heating surface of said heating plate and being seatable over and in intimate exchange contact with said heating surface during a crepe cooking operation, said pan, after being pre-heated on said heating plate, being adapted to have said outer surface dipped into crepe batter after which the pan is first rotated into a generally vertical position and held there momentarily and is then further rotated into an inverted position and positioned over said heating plate for cooking of the crepe with said thermostat switch in said "crepe cooking" position, said pan also being adapted to be supported in an upright position on said heating plate with said outer surface in intimate heat exchange contact with said heating surface for cooking other foods on said inner surface thereof with said thermostat switch in said "frying" position.

* * * * *